United States Patent
Walkow et al.

[19]

[11] Patent Number: 5,917,774
[45] Date of Patent: Jun. 29, 1999

[54] MAGNETIC MOTION COUPLING FOR WELL LOGGING INSTRUMENTS

[75] Inventors: Arnold M. Walkow; Randy Gold, both of Houston; Albert A. Alexy, Jr., Katy; Wade D. Dupree, Richmond; Saeed Rafie, Houston, all of Tex.

[73] Assignee: Western Atlas International, Inc., Houston, Tex.

[21] Appl. No.: 08/943,095

[22] Filed: Sep. 26, 1997

[51] Int. Cl.⁶ .................................................... G01V 1/40
[52] U.S. Cl. .................. 367/25; 367/25; 464/29; 181/102; 166/100; 417/420
[58] Field of Search ................. 367/25, 30, 24; 464/29; 181/102; 417/420; 166/100

[56] References Cited

U.S. PATENT DOCUMENTS

| | | | |
|---|---|---|---|
| 4,120,618 | 10/1978 | Klaus | 417/420 |
| 4,614,250 | 9/1986 | Panetta et al. | 181/102 |
| 4,715,440 | 12/1987 | Boxell et al. | 166/100 |
| 5,209,699 | 5/1993 | Hashimoto et al. | 464/29 |
| 5,528,556 | 6/1996 | Seeman et al. | 367/25 |

Primary Examiner—John Barlow
Assistant Examiner—Anthony Jolly
Attorney, Agent, or Firm—Richard A. Fagin

[57] ABSTRACT

A magnetic coupling for substantially synchronously transferring linear motion through a non magnetic barrier from a first movable element to a second movable element. The coupling comprises magnets disposed at spaced apart locations along the first element. The magnets each have a magnetization direction substantially perpendicular to a direction of motion of the first element along the non magnetic barrier. The coupling includes magnets disposed at spaced apart locations along the second element at locations corresponding to locations of the magnets op the first element. Each of the magnets on the second element has a magnetization direction inclined at an oblique angle with respect to the magnetization direction of the corresponding magnet so as to capture magnetic flux from the magnets on the first element when either of the elements is moved along the barrier.

12 Claims, 4 Drawing Sheets

MAGNETIC MOTION COUPLING FOR WELL LOGGING INSTRUMENTS

BACKGROUND OF THE INVENTION

1. Field of the Invention

The invention is related to the field of well logging instrumentation. More specifically, the invention is related to mechanisms for applying lateral force to the housing of a well logging instrument such as a caliper arm or similar device, and mechanisms for coupling the motion of the caliper arm to a sensor for determining the amount of lateral extension of the caliper arm from the instrument housing.

2. Description of the Related Art

Many types of well logging instruments include caliper or back-up arms which selectably extend radially outward from the instrument housing and are placed in contact with the wall of a wellbore into which the instrument is inserted.

In many well logging instruments which have caliper or back-up arms, the arm is typically coupled to some type of resilient mechanism for pressing the arm into contact with the wall of the wellbore. In some logging instruments this mechanism can be strong enough to cause the instrument housing to be pushed into contact with the wall of the wellbore in reaction to the force exerted on the arm. Other instruments remain in the center of the wellbore between circumferentially spaced apart arms each forced into contact with the wellbore through a resilient mechanism. Other arm extending mechanisms are only strong enough to cause the arm itself to remain in contact with the wellbore wall. Examples of such well logging instruments including both types of arm-extending mechanisms can be found, for example in U.S. Pat. No. 4,614,250 issued to Panetta et al, in U.S. Pat. No. 4,715,440 issued to Boxell et al and in U.S. Pat. No. 5,528,556 issued to Delpuech et al. Most of the mechanisms known in the art are selectably controllable by the system operator, and can be fully retracted at the command of the system operator to facilitate insertion and removal of the well logging instrument from the wellbore.

In most types of arm-extending mechanisms, the arm is generally coupled to a sensor which can determine the amount of radial separation between the instrument housing and the end of the arm. The measurements made by this sensor can be scaled into measurements of the internal diameter of the wellbore at the point of contact between the arm and the wall of the wellbore. Prior art mechanisms for causing the arm to exert force, and prior art mechanisms for coupling the motion of the arm to the sensor typically required the use of various types of seals to exclude fluids in the wellbore from entering the main housing of the well logging instrument. The fluids in the wellbore are typically under very high hydrostatic pressure. The seals are therefore subject to frequent failure, allowing fluids in the wellbore to enter the instrument and damage it. These seals are also difficult and expensive to maintain because of the very high pressures that they must withstand.

Magnetic couplings are known in the art for transferring motion of a "driving" element to a "driven" element through a non-magnetic housing or container without the need to create a sealed passage through the wall of the housing. See for example, U.S. Pat. No. 3,245,665 issued to Steel and U.S. Pat. No. 4,120,618 issued to Klaus. Still another such magnetic coupling is shown in U.S. Pat. No. 5,209,699 issued to Hashimoto et al. The device shown in Hashimoto et al '699 is also intended to couple rotary motion without creating a passage through the wall of a vacuum chamber.

All of these prior art magnetic couplings, however, are adapted to transfer rotary motion between the driving element and the driven element, and at least in the case of the device shown in Hashimoto et al '699, to do so with a very high degree of synchronization between the movement of the driving element and the movement of the driven element. In the case of the well logging instruments including arm-extending mechanisms, however, the overall motion of linkages connecting the back-up arm to the sensor and to the driving device (the arm-forcing mechanism) is typically linear. The magnetic couplings known in the art do not provide appropriate means for coupling linear motion through the wall of a housing so as to be useful for transferring motion for caliper or back-up arms on well logging instruments. Positioning of permanent magnets or magnetic couplings on either side of the housing wall of a well logging instrument would provide some coupling of motion between the internal and external elements, but without more such a coupling would not provide enough synchronization of motion between the internal and external elements to be useful with a motion sensor to determine the internal diameter of the wellbore.

SUMMARY OF THE INVENTION

The invention is a magnetic coupling for substantially synchronously transferring linear motion through a non-magnetic barrier from a first movable element to a second movable element. The magnetic coupling includes magnets disposed at spaced apart locations along the first movable element. Each of the magnets on the first movable element has a magnetization direction which is substantially perpendicular to a direction of motion of the first element along the non-magnetic barrier. The coupling includes magnets disposed at spaced apart locations along the second movable element, each location corresponding to a location of one of the magnets on the first element. Magnets at the endmost locations on the second element have a magnetization direction which is inclined at an oblique angle with respect to the magnetization direction of the corresponding magnet on the first element, so as to capture magnetic flux from the magnets on the first element when either of the elements is moved along the non-magnetic barrier.

In one embodiment of the invention, the magnets on the second movable element are oriented opposite in polarity to the magnets on the first movable element so as to transfer motion by magnetic repulsion. In another embodiment, the magnets on the second element are oriented in the same polarity to the magnets on the first movable element so as to transfer motion by magnetic attraction.

In a preferred embodiment, the first and second movable elements each include at least one magnet between the endmost magnets, oriented in the same polarity to each other and substantially parallel to each other to transfer a large part of the force between the first and second movable elements by magnetic attraction. Synchronization of motion is provided by the endmost magnets in the second movable element which are oriented at oblique angles to the corresponding magnets in the first movable element.

In a particular embodiment of the invention, a well logging instrument includes a non-magnetic housing. The first element is disposed inside the housing. The second element is disposed outside the housing proximal to the first element and is coupled to a linkage which is moved corresponding to the extended distance of a back up arm from the housing. The first element is coupled to a motion sensor to measure the amount of movement of the first element and the amount of corresponding movement of the second element so that the internal diameter of a wellbore at the contact point of the back up arm can be determined.

DESCRIPTION OF THE PREFERRED EMBODIMENTS

Figure 1:
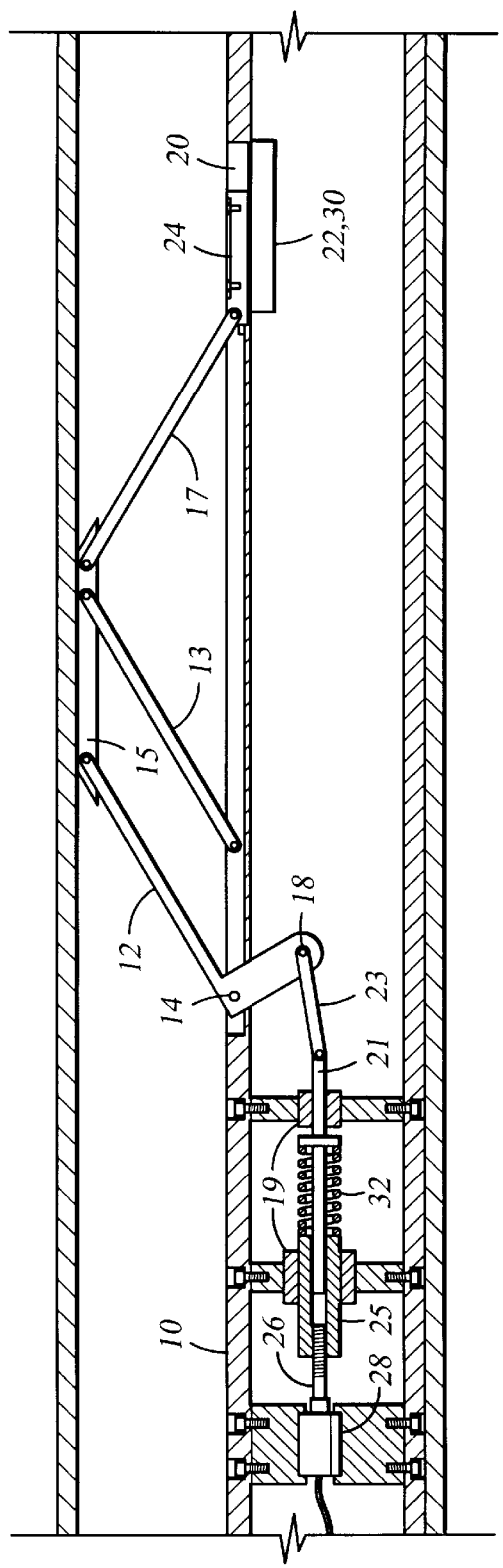
FIG. 1 shows a cross-section of part of a well logging instrument including the magnetic motion transfer device of the invention.

A cross section of a well logging instrument including a magnetic motion transfer device according to the invention is shown in FIG. 1. The well logging instrument, only a part of which is shown in FIG. 1 for clarity of the illustration, can be enclosed in a high-strength, substantially non-magnetic housing 10 such as can be made from monel or similar material known in the art which has the required strength and non-magnetic characteristics. A caliper arm 12 can be coupled to the exterior of the housing 10 through a first pivot 14 or the like which enables axial deflection of the caliper arm 12 with respect to the housing 10. The caliper arm 12 can be caused to axially deflect and laterally extend from the housing 10 by substantially linear movement of a drive link 23. One end of the drive link 23 can be coupled the caliper arm 12 by a second pivot 18. The opposite end of the drive link 23 can be coupled to a drive shaft 21, which can be moved substantially parallel to the axis of the housing 10 by compressing a spring 32 disposed at one end of the drive shaft 21. The spring 32 can be compressed by linear extension of a compression sleeve 25 when a lead screw 26 threadedly coupled thereto is turned by selective operation of a motor 28. The compression sleeve 25 and drive shaft 21 move linearly within appropriate bearings, shown generally at 19, when the motor 28 is operated to turn the lead screw 26.

As the caliper arm 12 is extended from the housing 10, it causes similar axial deflection of a parallel motion arm 13, which can be pivotally coupled at one end to the housing 10 and at its other end to a wear pad 15. The parallel motion arm 13 is intended to extend laterally away from the housing 10 in synchronism with the motion of the caliper arm 12. The wear pad 15 can be extended away from the housing 10 by the force exerted, through the caliper arm 12, by the compressed spring 32 until the wear pad 15 comes into contact with the wall of the wellbore 1. The wear pad 15 can be coupled at its other end to a slider arm 17. As the wear pad 15 extends laterally away from the housing 10, it causes the attached end of the slider arm 17 to move with it. Motion of the one end of the slider arm 17 causes the other end of the slider arm 17 to move linearly within an appropriate slot or sleeve 20 in the exterior surface of the housing 10. As the inside diameter of the wellbore changes, the wear pad 15 will move in response against the force exerted by the spring 32. Motion of the caliper arm 12 causes corresponding linear motion of the end of the slider arm 17 engaged in the slot 18. The foregoing description is meant to serve only as an example of a caliper arm linkage and actuating mechanism, and is not meant to limit the invention. Other caliper arm actuating mechanisms, such as hydraulic cylinders, electrical solenoids and the like are well known in the art and may also be used with this invention.

Attached to the sliding end of the slider arm 17 is a driving element of a magnetic motion transfer coupling, shown generally at 24. The driving element 24 will be explained in more detail. The motion of the wear pad 15 laterally with respect to the housing 10 will cause corresponding motion of the sliding end of the slider arm 17 and the attached driving element 24. Motion of the driving element 24, through magnetic forces, causes corresponding motion of a driven element 22 located inside the housing 10. The driven element 22 can be coupled to a linear motion transducer 30 of any type known in the art such as a potentiometer or a linear variable differential transformer ("LVDT"). The construction of the driven element 22 will also be explained in more detail. It is to be clearly understood that the driving element 24 and the driven element 22 are interchangeable. That is, an element configured as is the driving element 24 can perform the function of the driven element 22, and vice versa. The following descriptions of the driving element 24 and driven element 22 are only meant to serve as an example of how the elements 22, 24 can be formed and are not meant to limit the invention to the particular functions of each element 22, 24 as described herein.

Figures 2A, 2B:
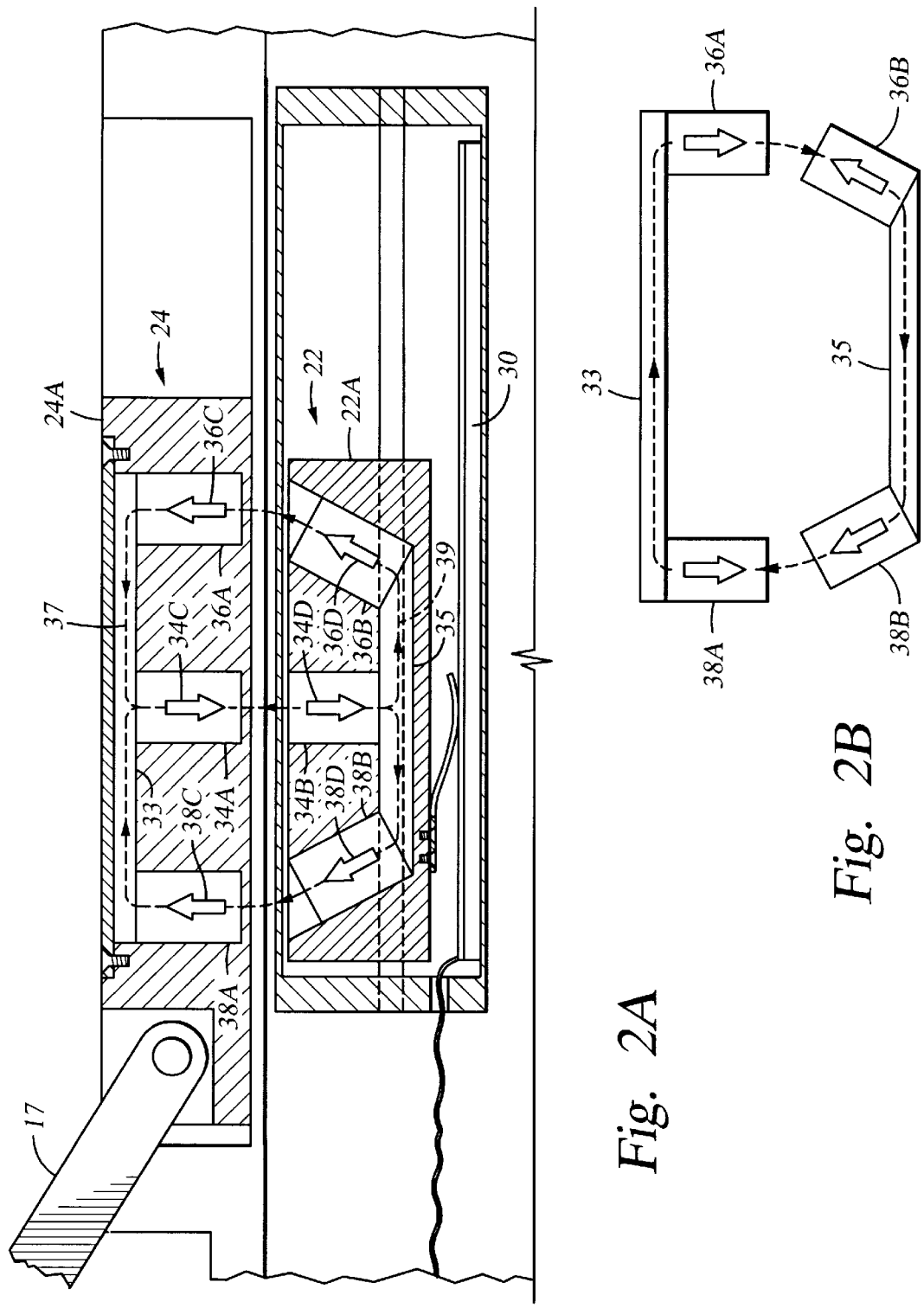
FIG. 2A shows one embodiment of the magnetic motion transfer device of the invention.
FIG. 2B shows another embodiment of the magnetic coupling of FIG. 2A.

The driving element 24 and driven element 22 are shown in more detail in FIG. 2A. The elements 22, 24 are shown disposed proximal to either side of the housing 10. The driving element 24 and the driven element 22 each include magnets fixed in a housing, shown at 24A, 22A, respectively. The housings 22A, 24A of each element 22, 24 are preferably made from a substantially non-magnetic material such as monel or the like. The driving element 24 includes three magnets 34A, 36A and 38A. The magnets 34A, 36A, 38A are preferably composed of high remanence magnetization material such as samarium-cobalt or similar. The magnets 34A, 36A, 38A can be oriented with their magnetization directions as indicated by corresponding arrows 34C, 36C, 38C. As shown in FIG. 2A, the magnets 34A, 36A, 38A are oriented so that their magnetization directions are substantially perpendicular to the wall of the housing 10 (and to the direction of motion of the elements 22, 24), and the center magnet 34A is oriented in opposite polarity to the end magnets 36A, 38A. The magnets 34A, 36A, 38A could each also be positioned in the opposite magnetic orientation to that shown in FIG. 2 for purposes of the invention. The ends of the magnets 34A, 36A, 38A farthest from the exterior of the instrument housing 10 are preferably magnetically coupled by a pole piece 33 which is preferably made from a high magnetic permeability material. As will be further explained, the magnets 36A, 38A at the endmost locations along the driving element 24 are used to induce substantially synchronous motion between the driving element 24 and the driven element 22. The center magnet 34A is used to provide a large coupling force between the driving element 24 and the driven element 22. It is contemplated that for certain applications not requiring the additional magnetic coupling force provided by the center magnet 34A, the center magnet 34A may be omitted. If the center magnet 34A is omitted, the pole piece 33 should also be omitted if the end magnets 36A, 38A are oriented as shown in FIG. 2A.

The housing 22A of the driven element 22 is also preferably made from a substantially non-magnetic material and can include magnets 34B, 36B, 38B each one corresponding to one of the magnets 34A, 36A, 38A in the driving element 24. Center magnet 34B should be oriented in the same magnetic polarity as is the corresponding magnet 34A in the driving element 24, as indicated by arrow 34D. The center magnet 34B, and its corresponding magnet 34A in the driving element 24, are included to provide substantial coupling force between the driving element 24 and the driven element 22, as previously explained. Endmost magnets 36B, 38B are positioned on the driven element 22 at locations just within the corresponding distance between the end magnets 36A, 38A on the driving element 24. The end magnets 36B, 38B on the driven element 22 are oriented at an oblique angle as shown in FIG. 2A, and are oriented in about the same polarity as are the end magnets 36A, 38A on the driving element 24, as indicated by arrows 38D and 36D. The orientation and location of the end magnets 36B, 38B causes the driven element 22 to move substantially synchronously with respect to motion of the driving element 24 by magnetic attraction between pairs of the end magnets 36A, 36B and 38A, 38B, respectively. Because the end magnets 36B, 38B are at an oblique angle with respect to the orientation of the end magnets 36A, 38A in the driver element 24, there is little opportunity for magnetic flux between the end magnets 36A, 36B and 38A, 38B, respectively to "bend" or "stretch", so that the motion of the driver element 24 and the driven element 22 is substantially synchronous. As is the case for the driving element 24, the driven element 22 preferably includes a pole piece 35 which magnetically couples the ends of all the magnets 34B, 36B, 38B positioned away from the wall of the instrument housing 10. The pole pieces 35, 33 close the magnetic flux lines 39, 37 between the coupled sets of magnets 38A, 34A, 36A, and 38B, 34B, 36B, respectively to improve the degree of synchronization between the driving element 24 and the driven element 22. As is the case for the driving element 24, if the center magnet 34B is omitted from the driven element 22, the pole piece 35 should be omitted if the endmost magnets 36B, 38B are oriented in the same polarity with respect to each other as is shown in FIG. 2A.

The oblique angle for the magnetization directions of the end magnets 36B, 38B in the driven element 22 as shown in FIG. 2A is about 30 degrees from parallel to the magnetization direction of the corresponding end magnets 36A, 38A in the driving element 24. It is contemplated that angles in the range of about 30 to 60 degrees will cause the driving element 24 and the driven element 22 to have substantially synchronous motion.

Alternatively, the end magnets 36A, 38A in the driving element 24 may be oriented in opposed polarity with respect to each other as shown in FIG. 2B. End magnets 36B, 38B in the driven element 22 should in this case be oriented in the same magnetic polarity as the corresponding magnets 36A, 38A in the driving element 24. If this magnet orientation is used, the pole pieces 33, 35 may be included to close the magnetic flux loop between the magnets. Alternatively, an even number of spaced apart center magnets (not shown in FIG. 2B) in each one of the driving element 24 and the driven element 22 may be included between the end magnets 36A, 34A, and 36B, 34B respectively, in the driving 24 and driven 22 elements and polarized as shown in FIG. 2B.

Figure 3:
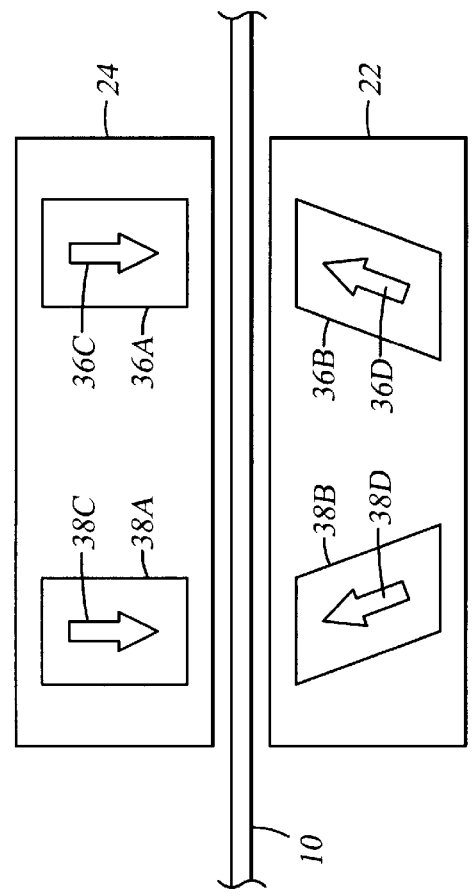
FIG. 3 shows another embodiment of the magnetic motion transfer device of the invention.

An alternative arrangement of magnets in the driving 24 and driven 22 elements is shown in FIG. 3. The driving element 24 in this alternative arrangement includes only end magnets 36A, 38A. The end magnets 36A, 38A can have magnetic polarities as shown by arrows 36C, 38C. The driven element 22 can also include only end magnets 38B, 36B. The end magnets 36B, 38B can be positioned in substantially the same position and at substantially the same oblique polarization angle as are the end magnets in the first embodiment of the driven element (22 as shown in FIG. 2A). End magnets 36B, 38B in the embodiment of FIG. 3 have magnetization directions substantially opposite to those of the end magnets 36A, 38A in the driving element 24. The motion of the driving element 24 is synchronously coupled to the driven element 22 by magnetic repulsion. Because the magnets 36B, 38B in the driven 22 element are in the same polarity relative to each other, and the magnets 36A, 38A in the driving 24 element are in the same polarity relative to each other, the pole pieces (33, 35 in FIG. 2A) are preferably not used with this configuration of the magnets.

Figures 4, 5:
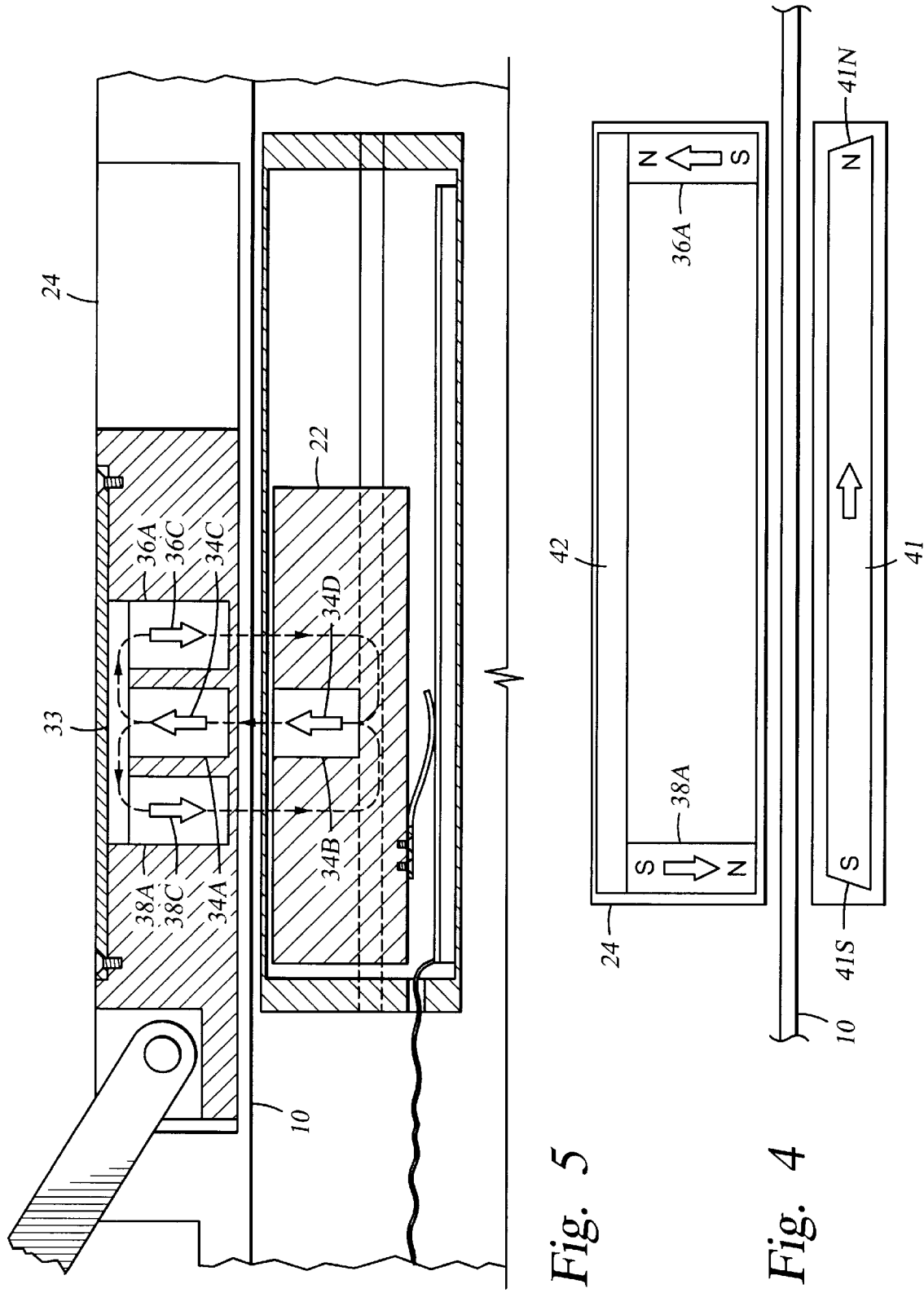
FIG. 4 shows still another embodiment of the magnetic motion transfer device of the invention.
FIG. 5 shows an additional embodiment of the magnetic motion transfer device.

Still another embodiment of the driving 24 and driven 22 elements is shown in FIG. 4. The driving element 24 can include two end magnets 38A, 36A polarized substantially perpendicularly to the motion of the element 24, but having magnetization directions substantially opposite to each other. The end magnets 38A, 36A can be coupled to each other at the ends opposite to the housing side of the driving element 24 by a pole piece 42 made from a high magnetic permeability material. The driven element 22 in FIG. 4 can include a single magnet 41 which has its magnetization substantially parallel to motion of the element 22. The magnetization direction of the magnet 41 is oriented opposite to the polarity of the driver element's magnets 38A, 36A. The ends 41S, 41N of magnet 40 are angled or canted to about the same oblique angle as the driven magnets (such as 36B, 38B in FIGS. 2A, 2B) of the first and second embodiments of the driven element 22 to improve magnetic flux "capture" between the driving element 24 and the driven element 22, and consequently the synchronization of movement between the elements 22, 24.

Another embodiment of the driving and driven elements is shown in FIG. 5. The driving element 24 can include end magnets 36A, 38A oriented as shown by arrows 36C, 38C, and a center magnet 34A oriented in opposite polarity to the end magnets 36A, 38A as shown by arrow 34C. The magnets 34A, 36A, 38A can be magnetically coupled on the ends opposite the housing side by a pole piece 33. The driven element 22 can include only one magnet, the center magnet 34B. Center magnet 34B has the same relative magnetic polarity as the corresponding center magnet 34A in the driving element 24. Center magnet 34B is caused to follow the linear motion of center magnet 34A along the housing 10 by magnetic attraction, and the motion is synchronized by magnetic repulsion from the endmost magnets 36A, 38A on the driving element 24.

Figure 6C:
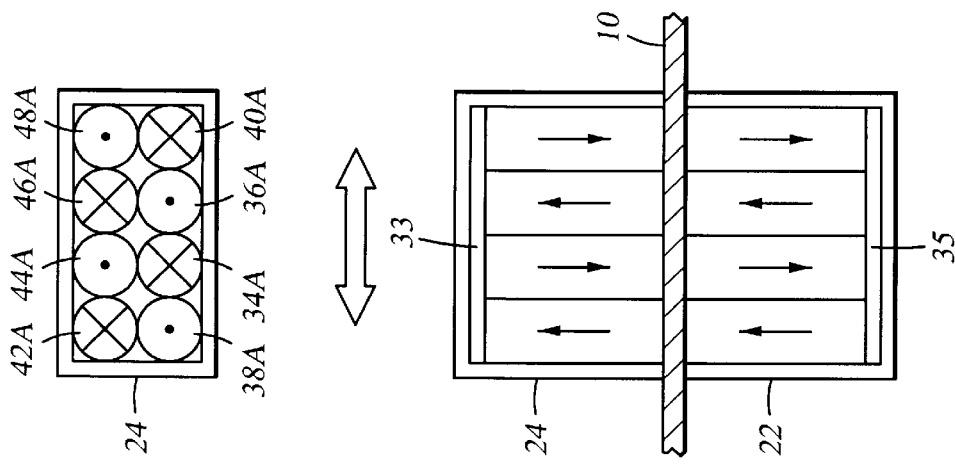
FIGS. 6A–6C show an arrangement of the embodiment in FIG. 5 wherein additional magnets are used.
Figure 6B:
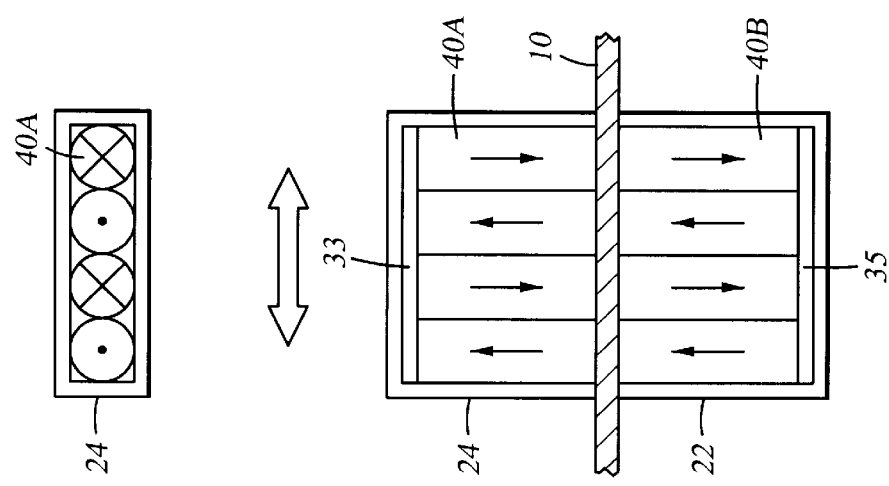
Figure 6A:
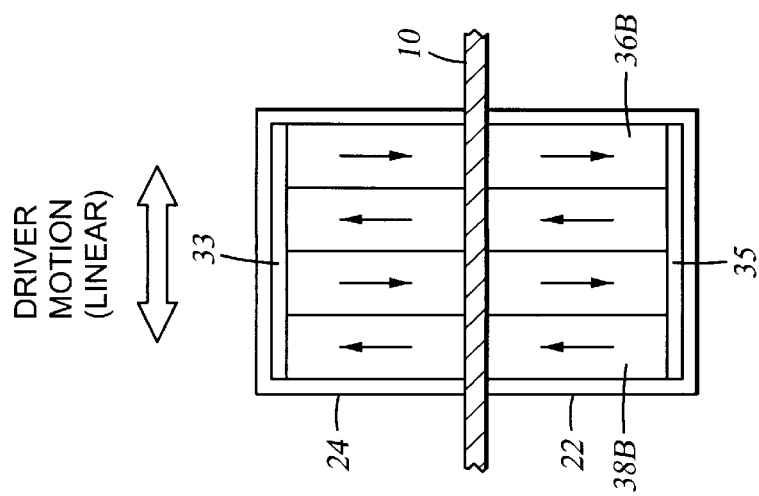

If more coupling force is desired, the driven element 22 can include end magnets. Referring to FIG. 6A, these end magnets are shown at 36B and 38B in locations corresponding to the locations of the end magnets 36A, 38A in the driving element 24. If the end magnets 36B, 38B are used in the driven element 22, the driven element 22 preferably includes a pole piece 35 to close the magnetic flux loop. If even more coupling force is desired, additional magnets can be positioned at corresponding locations in both the driving element 24 and the driven element 22, substantially along the line of motion of the elements 24, 22. These are shown at 40A and 40B in FIG. 6B. It is only necessary that each additional magnet such as shown at 40A on the driving element 24 and its corresponding magnet 40B on the driven element 22 have the opposite polarity to the magnet immediately adjacent to it on the same element. This arrangement of additional magnets enables motion coupling by magnetic attraction and synchronization of motion by magnetic repulsion just as for the simplified arrangement of magnets shown in FIG. 5.

It is also possible to replicate the basic magnet arrangement at locations in the elements 24, 22 which are offset from and parallel to the line of motion of the elements 22, 24. Referring now to FIG. 6C, a second row of magnets, shown at 42A, 44A, 46A, 48A in the top view of the driving element 24, can be arranged similarly to magnets 34A, 36A, 38A, 40A in the driving element 24, in a line substantially parallel to the line of motion of the driving element 24 and driven element 22. The second row of magnets 42A–48A is preferably in opposed polarity to the first row 34A–40A of magnets (along the line of motion) if the second row of magnets is immediately adjacent to the first row of magnets 34A–40A. A corresponding second row of magnets (not shown) can be included in the driven element 22. The magnets in the second row (not shown) in the driven element 22 should be oriented in the same polarity as the corresponding magnets in the driving element 24.

It is to be clearly understood that the driving element 24 and the driven element 22 can be interchangeable. That is, an element configured as is the driven element 22 can preform the function of the driving element 24, and vice versa. It is only required that each type of element be present in a motion coupling system to provide proper magnetic flux "capture" between the driven and driver elements. The preceding descriptions of the driven element 22 and driving element 24 are only meant to serve as examples of how the elements 22, 24 are configured. Other embodiments of the invention will be readily devised by those skilled in the art. Accordingly, the invention should be limited in scope only by the attached claims.

What is claimed is:

1. A magnetic coupling for substantially synchronously transferring linear motion through a non-magnetic barrier between a first movable element and a second movable element, comprising:

magnets disposed on said first element along a direction of said linear motion, said magnets each having a magnetization direction substantially perpendicular to said direction of motion;

magnets disposed along said second element each at a location corresponding to a location of each of said magnets on said first element, ones of said magnets on said second element at endmost locations having a magnetization direction inclined at an oblique angle with respect to said magnetization direction of said magnets on said first element so as to capture magnetic flux from said magnets on said first element when either one of said elements is moved along said barrier.

2. The magnetic coupling as defined in claim 1 wherein said endmost magnets on said second element each has a magnetization direction substantially opposed to said magnetization direction of the corresponding magnet on said first element.

3. The magnetic coupling as defined in claim 1 wherein said endmost magnets on said second element each has a magnetization direction substantially in the same polarity as said magnetization direction of a corresponding magnet on said first element.

4. The magnetic coupling as defined in claim 3 wherein said first and said second elements each further comprise at least one additional magnet positioned between said endmost magnets at corresponding locations along said first and said second movable elements, said at least one additional magnet in each of said first said second elements oriented in opposed polarity to the endmost magnets on the same element.

5. The magnetic coupling as defined in claim 4 further comprising in at least one of said first and said second movable element a pole piece proximal to pole ends of said endmost magnets and of said at least one additional magnet located farthest away from said non-magnetic barrier.

6. The magnetic motion coupling as defined in claim 1 wherein said first movable element is coupled to a caliper arm of a well logging instrument and is disposed outside of a housing of said well logging instrument, and said second movable element is coupled to a motion sensor disposed inside said housing of said well logging instrument whereby motion of said caliper arm in response to changes in an internal diameter of a wellbore are transmitted by magnetic forces to said motion sensor.

7. A well logging instrument comprising a caliper arm pivotally coupled to a non-magnetic instrument housing, said caliper arm coupled to a magnetic coupling for substantially synchronously transferring through said housing to a motion sensor, linear motion of an actuating link coupled to said caliper arm, comprising:

magnets disposed along a direction of said linear motion in a driving element coupled to said actuating link, said magnets each having a magnetization direction substantially perpendicular to said direction of motion;

magnets disposed along said direction of motion in a driven element coupled to said motion sensor at locations corresponding to locations of said magnets on said driving element, ones of said magnets on said driven clement positioned at endmost locations having a magnetization direction inclined at an oblique angle with respect to said magnetization direction of said magnets on said driving element, so as to capture magnetic flux from said magnets on said driving element when said driving element is moved along said housing to cause substantially synchronous motion of said driven element and said motion sensor.

8. The well logging apparatus as defined in claim 7 wherein said magnets disposed on said driven element each has a magnetization direction substantially opposed to said magnetization direction of a corresponding magnet on said driving element.

9. The well logging apparatus as defined in claim 7 wherein said magnets disposed on said driven element each has a magnetization direction substantially the same as the magnetization direction of a corresponding magnet on said driving element.

10. A well logging instrument comprising a caliper arm pivotally coupled to a non-magnetic instrument housing, said caliper arm coupled to a magnetic coupling for substantially synchronously transferring through said housing to a motion sensor, linear motion of an actuating link coupled to said caliper arm, comprising:

magnets disposed along a direction of said linear motion in a driven element coupled to said motion sensor, said magnets each having a magnetization direction substantially perpendicular to said direction of motion; and magnets disposed along said direction of motion in a driving element coupled to said actuating link at locations corresponding to locations of said magnets on said driven element, ones of said magnets on said driving element positioned at endmost locations having a magnetization direction inclined at an oblique angle with respect to said magnetization direction of said magnets on said driven element, so as to capture magnetic flux from said magnets on said driven element when said driving element is moved along said housing to cause substantially synchronous motion of said driven element and said motion sensor.

11. The well logging apparatus as defined in claim 10 wherein said magnets disposed on said driven element each has a magnetization direction substantially opposed to said magnetization direction of a corresponding magnet on said driving element.

12. The well logging apparatus as defined in claim 10 wherein said magnets disposed on said driven element each has a magnetization direction substantially the same as the magnetization direction of a corresponding magnet on said driving element.

* * * * *